June 29, 1943.  A. SCHRÖDER ET AL  2,322,977
GUIDE ROLLER SUPPORT
Filed Dec. 6, 1940
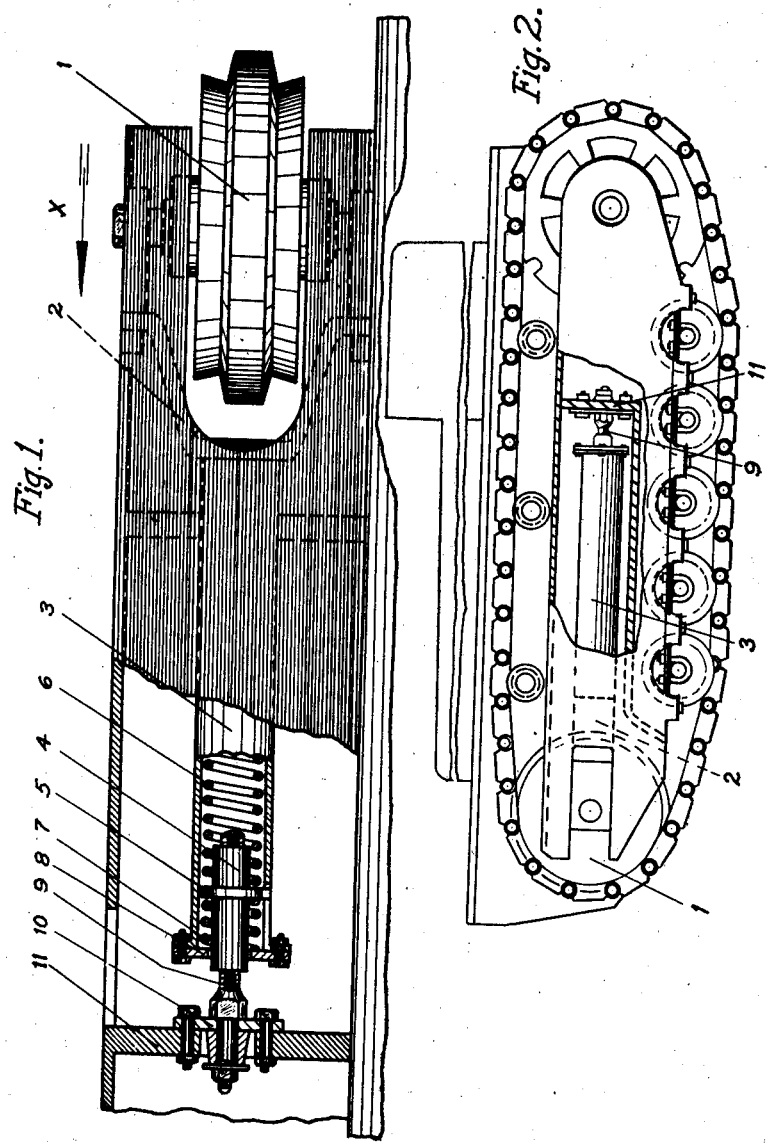
Inventors:
Alfred Schröder and Otto Falk
BY
Richards & Geier
ATTORNEYS Patented June 29, 1943

2,322,977

UNITED STATES PATENT OFFICE 2,322,977

GUIDE ROLLER SUPPORT

Alfred Schröder and Otto Falk, Breslau, Germany; vested in the Alien Property Custodian Application December 6, 1940, Serial No. 368,872
In Germany June 24, 1939

1 Claim. (Cl. 305—9)

This invention relates to a guide roller support and refers more particularly to a support for guide rollers of track chain vehicles.

In prior art constructions the guide roller of the chain was subjected to a force which acted continuously upon it and, consequently, upon the running chain, and which compensated at the same time for the changes in length of the track chain. If a foreign body was jammed between the track chain on the one hand and the driving wheel or the guide roller of the chain on the other hand, then the guide roller of the chain would be shifted vertically toward the driving wheel of the chain in a direction opposed to the action of a spring.

These prior art constructions have the drawback that the movement of the track chain over the guide roller and the driving wheel of the chain takes place while the chain is under tension. This decreases, in the first place, the efficiency of the chain drive and, furthermore, the bolts and bushings of the chains are subjected to considerable wear and tear, since the buckling of the track chain during its movement over the driving gear is effected under a considerable strain.

It is among the objects of the present invention to provide a comparatively inexpensive and effectively operating support for guide rollers of track chain vehicles, which is constructed with the view of eliminating the above-described disadvantages of prior art constructions.

Other objects of the present invention will become apparent in the course of the following specification.

In realizing the objects of the present invention, it was found advisable to provide such a support for the guide roller of the chain, that in a normal position the roller is held without exerting pressure by two spring forces which balance each other, so that the track chain is not subjected to any tension.

In accordance with a preferred embodiment of the inventive idea, the roller is pivotally mounted in a fork-shaped support having a tubular continuation which contains a spring support. This spring support may have the form of a coupling nut which is located between two springs and is movable longitudinally within the tube, the pressure of the two springs which are under tension being the same on both sides of the spring support.

An advantage of this construction is that the track chain operates normally without tension, so that the buckling of the track chain guided around the guide roller does not take place under tension and the bolts and bushings of the chain are spared.

The invention will appear more clearly from the following detailed description when taken in connection with the accompanying drawing showing by way of example a preferred embodiment of the inventive idea.

Figure 1 of the drawing illustrates a guide roller support partly in top view and partly in section.

Figure 2 shows partly in side elevation and partly in section a track chain vehicle provided with the guide roller support shown in Figure 1.

A guide roller 1 of a track chain is rotatably mounted in a fork-like support 2 which is rigidly connected with one end of a tube 3. A nut 4 is mounted within the tube 3 and may be moved longitudinally therein. The nut 4 is provided with a disc-like collar 5 which is situated between two coiled springs 6 and 7. The springs 6 and 7 are placed into the tube 3 under a predetermined compression.

The opposite end of the tube 3 carries a cover 8 which is firmly connected with the tube 3 by screws or the like and which serves as a support for the spring 7. The fork 2 constitutes the support for the spring 6.

The nut 4 is prevented from rotating by any suitable means, such as a projection guided in a slot of the tube 3. The nut 4 is carried by a threaded spindle 9 which is rotatably mounted in a plate or eye 10 and is firmly connected with the frame 11 of the vehicle.

Thus, the support illustrated in the drawing includes two springs 6 and 7, the forces of which are equal and opposed to each other, so that the pressure of the guide roller 1 against the track chain is eliminated. This diminishes the wear and tear of the chain links. Furthermore, the horizontal pressure of the guide roller 1 is practically eliminated.

If a foreign body is found between the chain and the guide roller or the runner, so that the guide roller 1 must make way and move in the direction of the arrow x, then the spring 6 will be subjected to additional tension, while the spring 7 gradually loses its original tension, the loss in tension of the spring 7 being greater than the increase in tension of the spring 6 in the given example.

The resilient pressure of the spring 7, will have its yielding effect upon the entire structure, when the foreign body is left behind and the guide roller 1 is moved by the springs back into its operative position, so that all the parts of the structure will be protected.

It is apparent that the specific illustration shown above has been given by way of illustration and not by way of limitation and that the structure above described is subject to wide variation and modification, without departing from the scope or intent of the present invention; all of such variations and modifications are to be included within the scope of the present invention.

What is claimed is:

In track chain vehicles, in combination with a track chain, and a guide roller for said track chain; a supporting device for the guide roller, said device comprising a fork-like support for the guide roller, a tube having one end connected with said support, a cover closing the other end of said tube and firmly connected therewith, two separate springs situated in said tube, a coupling nut situated between said two springs and engaged on opposite sides by adjacent ends of the two springs, the other end of one of said springs engaging said support, the other end of the other one of said springs engaging said cover, and means adjusting the position of said coupling nut relatively to the vehicle, whereby no pressure is transmitted by the guide roller and the track chain is maintained without tension in its normal position.

ALFRED SCHRÖDER.
OTTO FALK.